(12) United States Patent
Choi

(10) Patent No.: US 12,375,283 B2
(45) Date of Patent: Jul. 29, 2025

(54) DID SYSTEM USING BROWSER-BASED SECURITY PIN AUTHENTICATION, AND CONTROL METHOD THEREOF

(71) Applicant: SWEMPIRE CO., LTD., Goyang-si (KR)

(72) Inventor: Myoung Soo Choi, Goyang-si (KR)

(73) Assignee: SWEMPIRE CO., LTD., Goyang-si (KR)

( * ) Notice: Subject to any disclaimer, the term of this patent is extended or adjusted under 35 U.S.C. 154(b) by 192 days.

(21) Appl. No.: 18/314,319

(22) Filed: May 9, 2023

(65) Prior Publication Data
US 2023/0275762 A1 Aug. 31, 2023

Related U.S. Application Data

(63) Continuation of application No. PCT/KR2021/012039, filed on Sep. 6, 2021.

(30) Foreign Application Priority Data

Nov. 10, 2020 (KR) ........................ 10-2020-0148988

(51) Int. Cl.
*H04L 9/32* (2006.01)
*H04L 9/00* (2022.01)
*H04L 9/08* (2006.01)

(52) U.S. Cl.
CPC .......... *H04L 9/3226* (2013.01); *H04L 9/0894* (2013.01); *H04L 9/50* (2022.05)

(58) Field of Classification Search
CPC ....... H04L 9/3226; H04L 9/0894; H04L 9/50; H04L 63/0428; H04L 63/083; G06F 21/31
See application file for complete search history.

(56) References Cited

U.S. PATENT DOCUMENTS 8,756,665 B2 6/2014 Pieczul et al.
9,092,609 B2 7/2015 Pieczul et al.
(Continued)

FOREIGN PATENT DOCUMENTS

KR 10-2014-0037190 A 3/2014
KR 10-1666374 B1 10/2016
(Continued)

OTHER PUBLICATIONS

Bander Alzahrani, "An information-Centric Networking Based Registry for Decentralized Identifiers and Verifiable Credentials," 2020, pp. 137198-137208 (Year: 2020).*
(Continued)

*Primary Examiner* — Luu T Pham
*Assistant Examiner* — Canh Le
(74) *Attorney, Agent, or Firm* — Studebaker Brackett PLLC

(57) ABSTRACT

The present disclosure relates to a DID system and a method, using browser-based security PIN authentication, which can perform DID identity verification on a browser even though a program for the user's identity verification is not installed or is not used, thereby solving the problem of compatibility between programs. The DID system and method can easily obtain credentials through the cloud server even in using a browser in which the credentials are not stored, thereby simplifying the identity verification procedure. When there is a request for identity verification while using the browser in which the credentials are not stored, the present invention can provide a new control method capable of performing identity verification even if there is no cloud server since performing identity verification by utilizing the browser in which the credentials are stored or by loading the credentials from the browser in which the credentials are stored.

10 Claims, 9 Drawing Sheets

(56) References Cited

U.S. PATENT DOCUMENTS

| | | |
|---|---|---|
| 9,992,187 B2 | 6/2018 | Lu et al. |
| 10,742,411 B2 | 8/2020 | Patel et al. |
| 10,790,975 B2 | 9/2020 | Patel et al. |
| 10,903,996 B2 | 1/2021 | Patel et al. |
| 11,159,315 B2 | 10/2021 | Patel et al. |
| 2013/0014239 A1 | 1/2013 | Pieczul et al. |
| 2013/0047235 A1 | 2/2013 | Pieczul et al. |
| 2017/0180351 A1 | 6/2017 | Lu et al. |
| 2019/0228406 A1 | 7/2019 | Patel et al. |
| 2019/0229909 A1 | 7/2019 | Patel et al. |
| 2019/0229914 A1 | 7/2019 | Patel et al. |
| 2019/0230073 A1 | 7/2019 | Patel et al. |
| 2019/0230092 A1 | 7/2019 | Patel et al. |
| 2021/0126796 A1* | 4/2021 | Soundararajan ...... H04L 9/0637 |
| 2021/0281411 A1* | 9/2021 | Murdoch ......... G06Q 20/38215 |
| 2022/0261810 A1* | 8/2022 | Kim .................. G06Q 30/0214 |

FOREIGN PATENT DOCUMENTS

| | | |
|---|---|---|
| KR | 10-2101726 B1 | 5/2020 |
| KR | 10-2139645 B1 | 7/2020 |
| KR | 10-2248237 B1 | 5/2021 |

OTHER PUBLICATIONS

Zoltan Lux et al. "Distributed-Ledger-based Authentication with Decentralized Identifiers and Verifiable Credentials", 2020, pp. 1-8 (Year: 2020).*

International Search Report issued in PCT/KR2021/012039; mailed Dec. 13, 2021.

\* cited by examiner

DID SYSTEM USING BROWSER-BASED SECURITY PIN AUTHENTICATION, AND CONTROL METHOD THEREOF

CROSS-REFERENCE TO RELATED APPLICATION

The present application is a continuation of International Patent Application No. PCT/KR2021/012039, filed on Sep. 6, 2021, which is based upon and claims the benefit of priority to Korean Patent Application No. 10-2020-0148988 filed on Nov. 10, 2020. The disclosures of the above-listed applications are hereby incorporated by reference herein in their entirety.

BACKGROUND

1. Technical Field

The present disclosure relates to a decentralized identifier (DID) system using browser-based security PIN authentication, and a control method thereof. More specifically, the present disclosure relates to a decentralized identifier (DID) system using browser-based security PIN authentication, and a control method thereof, which can perform verification on a browser using a credential received from a server.

2. Description of Related Art

Due to the development of internet services, most people use numerous online services, such as government agencies, educational institutions, medical institutions, telecommunications companies, financial companies, passenger transport companies, asset management, credit information, portals, social network services (SNS), games, shopping, ticketing, delivery, electronic voting, etc.

Therefore, in order to use these services, a user must either sign up as a member by entering the user's personal information including the user's real name, or authenticate himself or herself as a registered user by entering the user's specific ID and password. However, repeating this authentication process for multiple sites is somewhat cumbersome. Recently, the development of simple authentication has been helping users to easily log in and conduct financial transactions on the internet.

Conventionally, user authentication has been performed through a centralized identifier (ID) system, and typically, authentication was performed by installing public certification and the Active X program needed to use the public certification or by installing an application (App) to perform authentication.

However, such a centralized identifier system has problems with privacy breaches and misuse.

Moreover, in the case of verifying a user's identity using the above-mentioned program or application, it may be troublesome to install separate programs, and verification of a user's identity is not performed smoothly due to a compatibility problem with the existing applications or programs.

SUMMARY

The present disclosure has been made to solve the above-mentioned problems occurring in the prior art, and in an aspect of the present disclosure, an object of the present disclosure is to provide a decentralized identifier (DID) system using browser-based security PIN authentication and a control method thereof, which can perform user identity verification.

Another object of the present disclosure is to provide a decentralized identifier (DID) system using browser-based security PIN authentication and a control method thereof, which can perform user identity verification, even between different browsers.

A further object of the present disclosure is to provide a decentralized identifier (DID) system using browser-based security PIN authentication and a control method thereof, which can manage credentials used for user identity verification in an optimized manner by utilizing a cloud server.

The aspects of the present disclosure are not limited to those mentioned above, and other aspects not mentioned herein will be clearly understood by those skilled in the art from the following description.

To accomplish the above-mentioned objects, according to an aspect of the present disclosure, there is provided a decentralized identifier (DID) system using browser-based security PIN authentication including: a server that issues verifiable credentials for a decentralized identifier (DID); and a terminal receiving the credentials from the server, and transmits the credentials to a verification device that requests verification for the decentralized identifier, wherein the terminal stores the credentials issued by the server in the local storage of a browser installed in the terminal, executes the browser in a case in which identity verification is requested by the verification device during the provision of a specific service, performs browser PIN authentication to access the credentials stored in the local storage of the executed browser, transmits the credentials to the verification device in a case in which the browser PIN authentication is successful, receives purpose information requested by the verification device, requests issuance of a credential corresponding to the purpose information to the server, receives a credential corresponding to the purpose information from the server to include the decentralized identifier of the terminal, transmits the credential corresponding to the verification device to the verification device to perform verification of the identity and the purpose information of the terminal, registers the decentralized identifier in a blockchain-based storage established in advance, and deletes the credentials stored in the local storage of the browser in response to a request for deletion of the credentials, wherein the server extracts the decentralized identifier registered in the storage in response to the request for identity verification from the verification device.

In this instance, the executed browser is a browser storing the credentials in the local storage or a browser storing credentials corresponding to the purpose information requested by the verification device.

Moreover, the server generates credentials including a decentralized identifier in a case in which credentials for the decentralized identifier registered in the storage are requested by the terminal, and the credentials including the decentralized identifier are transmitted to the terminal.

Furthermore, the terminal encrypts the credentials received from the server and stores the encrypted credentials in the local storage of the browser.

In addition, the server issues credentials to reflect a use purpose of the decentralized identifier, and transmits the issued credentials to the terminal, and the verification device verifies whether or not the decentralized identifier matches the use purpose using the credentials received from the terminal.

According to another aspect of the present disclosure, there is provided a control method of a decentralized identifier (DID) system including a server and a terminal, including the operations of: the server issuing verifiable credentials for a decentralized identifier (DID); and the terminal receiving the credentials from the server, and transmitting the credentials to a verification device that requests verification for the decentralized identifier, wherein the terminal stores the credentials issued by the server in the local storage of a browser installed in the terminal, executes the browser in a case in which identity verification is requested by the verification device during the provision of a specific service, performs browser PIN authentication to access the credentials stored in the local storage of the executed browser, transmits the credentials to the verification device in a case in which the browser PIN authentication is successful, receives purpose information requested by the verification device, requests issuance of a credential corresponding to the purpose information to the server, receives a credential corresponding to the purpose information from the server to include the decentralized identifier of the terminal, transmits the credential corresponding to the verification device to the verification device to perform verification of the identity and the purpose information of the terminal, registers the decentralized identifier in a blockchain-based storage established in advance, and deletes the credentials stored in the local storage of the browser in response to a request for deletion of the credentials, and wherein the server extracts the decentralized identifier registered in the storage in response to the request for identity verification from the verification device.

Other specific aspects of the present disclosure are described in detail and illustrated in the accompanying drawings.

DETAILED DESCRIPTION

Advantages and features of the present disclosure and methods accomplishing the advantages and features will become apparent from the following detailed description of exemplary embodiments with reference to the accompanying drawings. However, the present disclosure is not limited to exemplary embodiment disclosed herein but will be implemented in various forms. The exemplary embodiments are provided so that the present disclosure is completely disclosed, and a person of ordinary skilled in the art can fully understand the scope of the present disclosure. Therefore, the present disclosure will be defined only by the scope of the appended claims.

Terms used in the specification are used to describe specific embodiments of the present disclosure and are not intended to limit the scope of the present disclosure. In the specification, the terms of a singular form may include plural forms unless otherwise specified. It should be also understood that the terms of 'include' or 'have' in the specification are used to mean that there is no intent to exclude existence or addition of other components besides components described in the specification. In the detailed description, the same reference numbers of the drawings refer to the same or equivalent parts of the present disclosure, and the term "and/or" is understood to include a combination of one or more of components described above. It will be understood that terms, such as "first" or "second" may be used in the specification to describe various components but are not restricted to the above terms. The terms may be used to discriminate one component from another component. Therefore, of course, the first component may be named as the second component within the scope of the present disclosure.

Unless otherwise defined, all terms (including technical and scientific terms) used herein have the same meaning as commonly understood by those skilled in the technical field to which the present disclosure pertains. It will be further understood that terms, such as those defined in commonly used dictionaries, should not be interpreted in an idealized or overly formal sense unless expressly so defined herein.

Hereinafter, preferred embodiments of the present disclosure will be described in detail with reference to the accompanying drawings.

Figure 1:
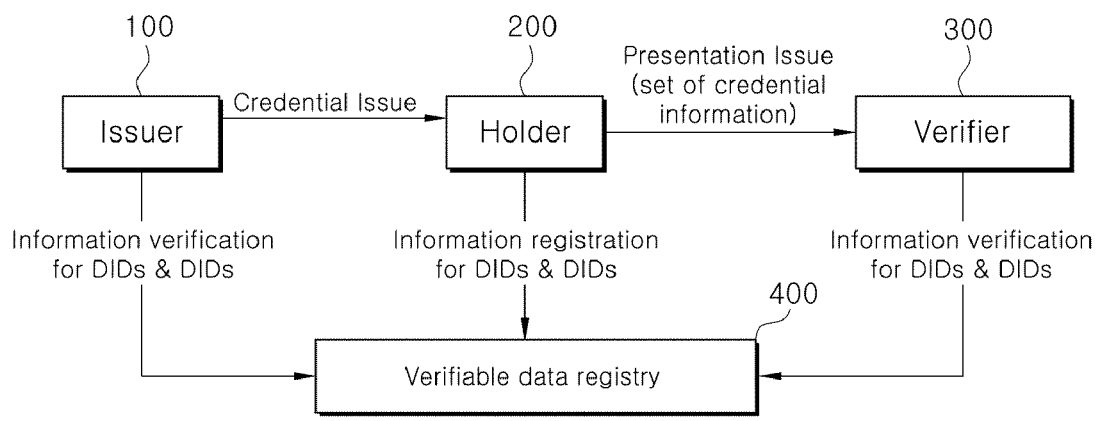
FIG. 1 is a conceptual diagram depicting a decentralized identifier (DID) system according to the present disclosure.

FIG. 1 is a conceptual diagram depicting a decentralized identifier (DID) system according to the present disclosure.

A DID according to one embodiment of the present disclosure can refer to a decentralized identifier.

The decentralized identifier described in this specification refers to a globally unique identifier which does not require a registration agency, such as a centralized server, by registering in distributed repositories utilizing distributed ledger technology or other distributed network technologies.

Identity is a set of multiple attributes that distinguish an entity in a certain domain, and an identifier (id) refers to a symbol consisting of a series of numbers, characters, or symbols that uniquely designate the identity.

In the existing centralized identity management system, a service provider manages users' digital identities centrally. The service provider issues a user ID and credentials (such as a password) to verify the user's identity, and holds and manages user information such as a name and an address of the user.

In this system, the user's identity is entrusted to a central authority to be managed by the central authority, and it is difficult for the user to control the user's identity, personal data, and related attribute information managed by the central authority.

In contrast, the DID system of the present disclosure enables the user to manage the user's identity information using distributed network technology such as blockchain. This type of the system is called a decentralized identity management system, and the identifier used for this purpose is called a decentralized identifier (DID).

The DID system according to an embodiment of the present disclosure may include a server 100 acting as an issuer, a terminal 200 acting as a holder, a verification device 300 acting as a verifier, and a verifiable distributed data storage 400.

The server 100 can issue verifiable credentials for the decentralized identifier (DID).

That is, the server 100, as an issuer, can issue verifiable credentials for a specific user, i.e., an identity owner.

In this context, credentials refer to a set of data used to prove identity or qualification.

For example, credentials may include a password used to prove ownership of an identifier, a public key used to prove possession of a private key, a public key issued by a reliable third party who can prove the connection between the public key and the owner, and information of a third-party certification authority.

The terminal 200 described in this specification may include a mobile terminal, a cellular phone, a smart phone, a laptop computer, a digital broadcasting terminal, a personal digital assistant (PDA), a portable multimedia player (PMP), a navigation device, a slate PC, a tablet PC, an ultrabook, a wearable device (such as a smartwatch, smart glasses, or a head-mounted display), and the like.

However, any person skilled in the art would easily recognize that the terminal 200 according to the embodiment described in this specification may be applicable not only to a mobile terminal but also to a fixed terminal such as a digital TV, a desktop computer, a digital signage, etc., except for a case applicable only to a mobile terminal.

The terminal 200 can receive credentials from the server 100, and transmit (or issue) the credentials (or presentations, which are sets of credential information) to the verification device 300 that requests verification for the decentralized identifier.

That is, the terminal 200, as an owner, may receive a DID-combined credential issued to an issuer (server 100), which guarantees the user's identity, through a certain procedure, provide the credential to a verifier (verification device 300) when necessary to use services.

The verification device 300, as a verifier, can request credentials from the owner (terminal 200) when identity verification is required and verify the identity.

The storage 400 may mainly use a distributed ledger, such as a blockchain, as a mechanism for storing the DID, but may use other types of distributed storages.

Since the blockchain is generally well-known, detailed descriptions of the blockchain will be omitted in this specification.

The DID is an identifier for a specific entity, and explanation of the entity is expressed as a DID document (DOD). The DID document includes information related to an identity subject, and methods capable of verifying the information, such as a set of public keys of the DID, a set of authentication protocols, and a set of service endpoints that capable of communicating or interacting with the corresponding entity.

For example, the DID document may be transmitted and received together with a decentralized identifier or a credential.

Meanwhile, the DID system of the present disclosure can register and verify the purpose information of the decentralized identifier.

For example, the terminal 200 and the server 100 may issue and receive credentials to reflect the use purpose of the decentralized identifier, and the verification device 300 may verify whether the decentralized identifier conforms to the purpose or not, using the credentials.

Hereinafter, a control method for the DID system will be described in detail with reference to the attached drawings.

Figure 2:
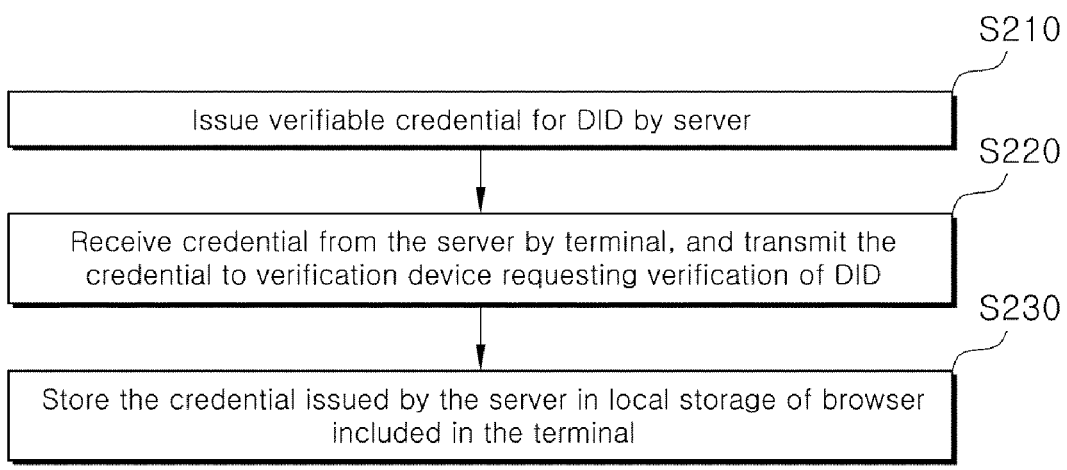
FIG. 2 is a conceptual diagram depicting a control method of the DID system according to an embodiment of the present disclosure.

FIG. 2 is a conceptual diagram depicting a control method of the DID system according to an embodiment of the present disclosure.

First, in the present disclosure, an operation (S210) of issuing verifiable credentials for a decentralized identifier is performed by the server 100.

The server 100 may issue credentials based on receiving a request for issuance of credentials from the terminal 200.

In this instance, the server 100 may issue a credential to include the decentralized identifier (DID) of the terminal 200.

The decentralized identifier (DID) may be transmitted when the terminal 200 transmits a request for credential issuance to the server 100. If the terminal 200 has previously registered the decentralized identifier (DID) in the storage 400, for example, blockchain, the server 100 may extract or acquire the decentralized identifier from the storage 400 in response to the request.

For example, the terminal 200 may generate a decentralized identifier, and register the decentralized identifier in a blockchain-based storage.

When receiving a request for a credential for the decentralized identifier registered in the storage 400 from the terminal 100, the server 100 may generate a credential including the decentralized identifier and transmit the credential including the decentralized identifier to the terminal 200.

Subsequently, in the present disclosure, an operation (S220) of the terminal 200 receiving the credential from the server 100 and transmitting the credential to the verification device 300 that requests verification for the decentralized identifier is performed.

Here, requesting verification for the decentralized identifier may mean requesting identity verification for the terminal or the user using the terminal.

In addition, performing verification for the decentralized identifier may include performing identity verification for the terminal 200 or the terminal user, and may mean transmitting the credential to the verification device 300.

The terminal 200 may receive a request for identity verification from the verification device 300 providing a service while using a certain service or in order to use a certain service. In this case, the terminal 200 may request a credential to the server 100, and transmit the received credential to the verification device 300 to perform identity verification.

More specifically, the terminal 200 may receive purpose information required by the verification device 300 from the verification device 300, and request issuance of a credential corresponding (matching) to the purpose information to the server 100.

Thereafter, the server 100 may issue a credential corresponding to the purpose information to include the decentralized identifier (DID) of the terminal 200 (or under the name of the decentralized identifier (DID)), and transmit the credential to the terminal 200.

The terminal 200 may transmit the credential to the verification device 300 to perform verification of the identity and purpose information of the terminal.

In this case, the terminal 200 of the present disclosure may include at least one browser. Here, the browser means software that displays web information from the internet on a computer screen, and may be basically installed in the terminal 200.

For example, the browser may include various types of browsers such as Internet Explorer, Chrome, Safari, and Microsoft Edge.

Each browser has a local storage. The local storage of the browser means a space for storing data generated while using each browser.

A portion of the memory of the terminal 200 may be allocated as the local storage of the browser.

In the present disclosure, an operation (S230) of the terminal 200 storing the credential issued by the server 100 in the local storage of the browser included in the terminal 200 is performed.

The terminal 200 may receive the credential issued from the server 100 and store the received credential in the local storage of the browser.

In this case, the terminal 200 may request the credential to the server 100 through any one type of browser, and when the credential is received from the server 100, the terminal 200 may store the credential in the local storage of the requested one type of browser.

In addition, the terminal 200 may encrypt the credential received from the server 100. That is, the terminal 200 may encrypt the credential received from the server 100 and store the encrypted credential in the local storage of the browser.

Meanwhile, the DID system of the present disclosure may strengthen security in order to store verifiable credentials for the decentralized identifier in the local storage of the browser.

For this purpose, the terminal 200 of the DID system according to the present invention may perform browser PIN (Personal Identification Number) authentication through the browser to access the credentials.

The terminal 200 may be configured to access the credentials stored in the local storage of the browser based on the successful browser PIN authentication.

In a case in which the terminal 200 accesses the encrypted credentials stored in the local storage of the browser through browser PIN authentication, the terminal 200 may decrypt the encrypted credentials and transmit the decrypted credentials to the verification device 300.

During the use of any service, the terminal 200 may receive a request for identity verification from the verification device 300. Here, the service may include all kinds of services that can be provided through the terminal 200, and may include at least one among Internet, games, shopping, payment, access to specific web pages, and downloading of contents.

Furthermore, the service may be executed through a browser, a program, or an application.

As an example, the verification device 300 may be a server or a service provider device associated with a company which provides the service.

The terminal 200 may execute the browser based on the request for identity verification from the verification device 300 during the use of any service.

Here, the executed browser may be a browser that has stored the credentials in the local storage or a browser storing the credentials corresponding to the purpose information requested by the verification device in the local storage.

The terminal 200 may perform browser PIN authentication to access the credentials stored in the local storage of the browser.

Thereafter, based on the successful PIN authentication, the terminal 200 may transmit the credentials to the verification device 300, and perform identity verification through this process.

As described above, when the purpose information utilizing the decentralized identifier is received from the verification device 300, the terminal 200 may transmit the purpose information utilizing the decentralized identifier to the server 100.

The server 100 may issue credentials which can perform verification for the purpose information, i.e., credentials corresponding to or matching the purpose information, or credentials reflecting the purpose information, to the terminal 200.

It is obvious that the decentralized identifier may be included in the credentials.

The terminal 200 may transmit the received credentials to the verification device 300 to perform verification of the decentralized identifier and purpose information.

As described above, the present invention may significantly increase convenience and speed in identity verification not by performing identity verification through an application or a program but by performing identity verification through a highly compatible browser in any situation by storing the credentials in the local storage of the browser, which is basic software of the terminal.

Figure 3:
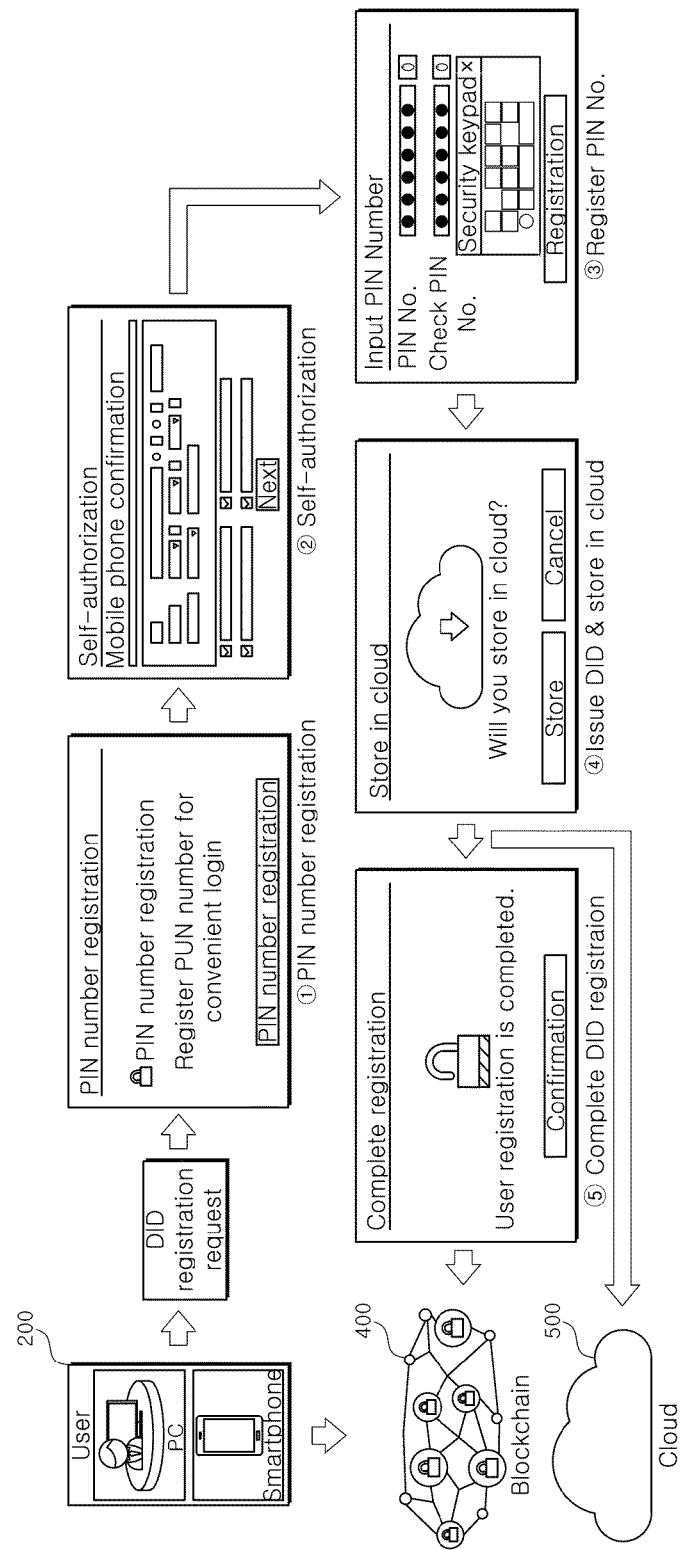
FIGS. 3 to 5 are conceptual diagrams depicting a method of registering, authenticating, and deleting a DID-based user identity in the DID system of the present disclosure.
Figure 4:
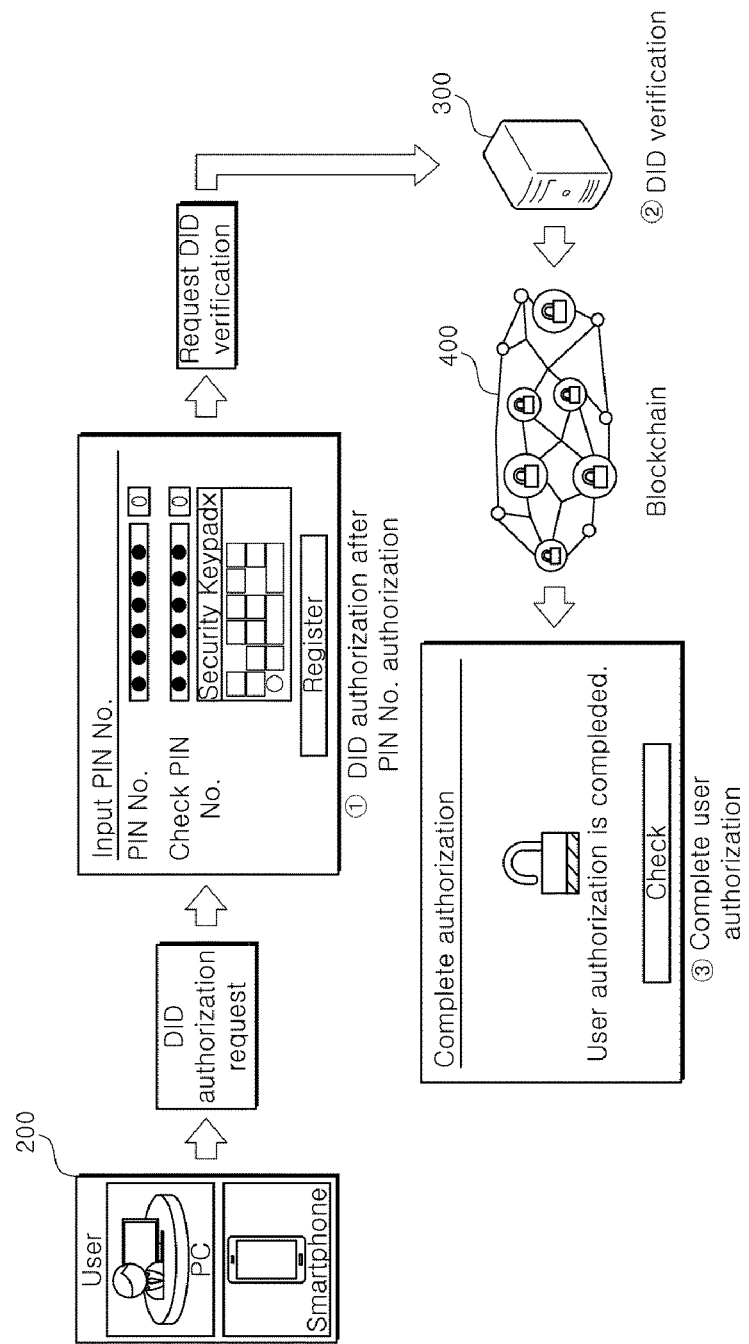
Figure 5:
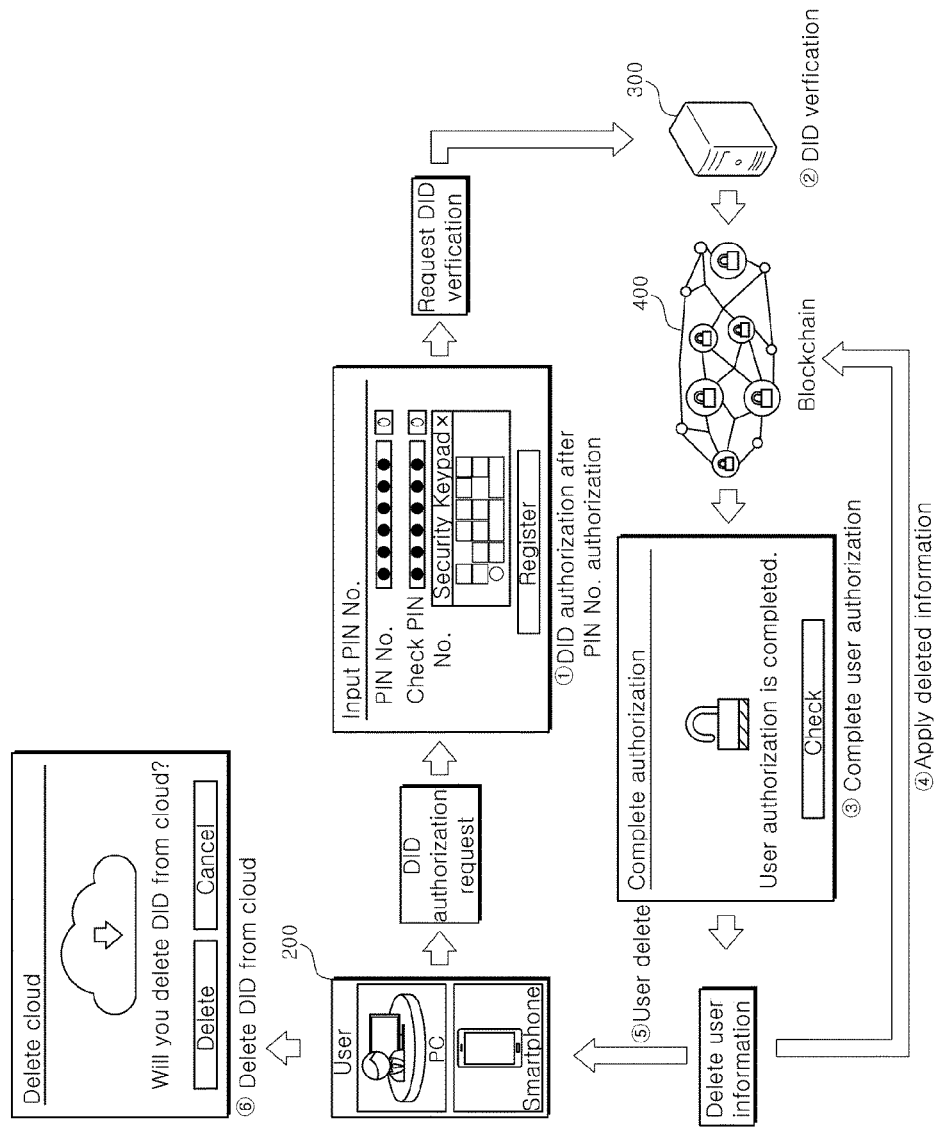

FIGS. 3 to 5 are conceptual diagrams depicting a method of registering, authenticating, and deleting a DID-based user identity in the DID system of the present disclosure.

FIG. 3 is a conceptual diagram depicting a DID-based user identity registration procedure.

First, the terminal 200 may receive a DID registration request from the user.

The DID registration request may, for example, refer to a request to store (register) the credentials received from the server in the local storage of the browser.

In order to store (register) credentials that can verify a decentralized identifier in the browser's local storage, the terminal 200 may register a PIN number.

In order to register a PIN number, the terminal 200 may perform user authentication.

When the PIN number registration is completed, the terminal 200 may store the credentials received from the server 100 in at least one of the local storage of the browser and the cloud server 500.

The registered PIN number is used for browser PIN authentication performed to access the credentials stored in the local storage of the browser, and the registered PIN number may be encrypted and registered (stored) in the browser.

At this time, the terminal 200 may encrypt the credentials and store (register) the credentials in the local storage of the browser.

In addition, the terminal 200 may register at least one of the decentralized identifier and credentials in the blockchain (storage) 400 or store the same in the cloud server 500.

In this instance, at least one of the decentralized identifier and credentials transmitted to the storage 400 or the cloud server 500 may be encrypted.

FIG. 4 is a conceptual diagram depicting a DID-based user identity verification procedure.

Referring to FIG. 4, the terminal 200 may receive a DID authentication request, i.e., a request for identity verification, from the verification device 300 during the use of any service.

In this case, the terminal 200 may perform browser PIN authentication to access the credentials stored in the local storage of the browser.

Based on the success of the browser PIN authentication, the terminal 200 may access the local storage of the browser and transmit the credentials to the verification device 300 that requested identity verification (DID verification request).

Subsequently, the verification device 300 may perform verification of the decentralized identifier stored in the blockchain-based storage 400 using the credentials received from the terminal 200.

FIG. 5 is a conceptual diagram depicting a DID-based user identity deleting procedure.

As illustrated in FIG. 4, the terminal 200 may access the credentials (user identity) stored in the local storage of the browser, and delete the credentials stored in the local storage of the browser based on a request for deleting the user's credentials.

Moreover, if the credentials are stored in a cloud server, the terminal 200 may also request deletion of the credentials to the cloud server.

Meanwhile, the present disclosure may provide a DID system and a control method thereof capable of performing optimized DID verification when a plurality of browsers exist.

Hereinafter, a method of performing verification of the decentralized identifier using the plurality of browsers will be described more specifically with reference to the attached drawings.

Figure 6:
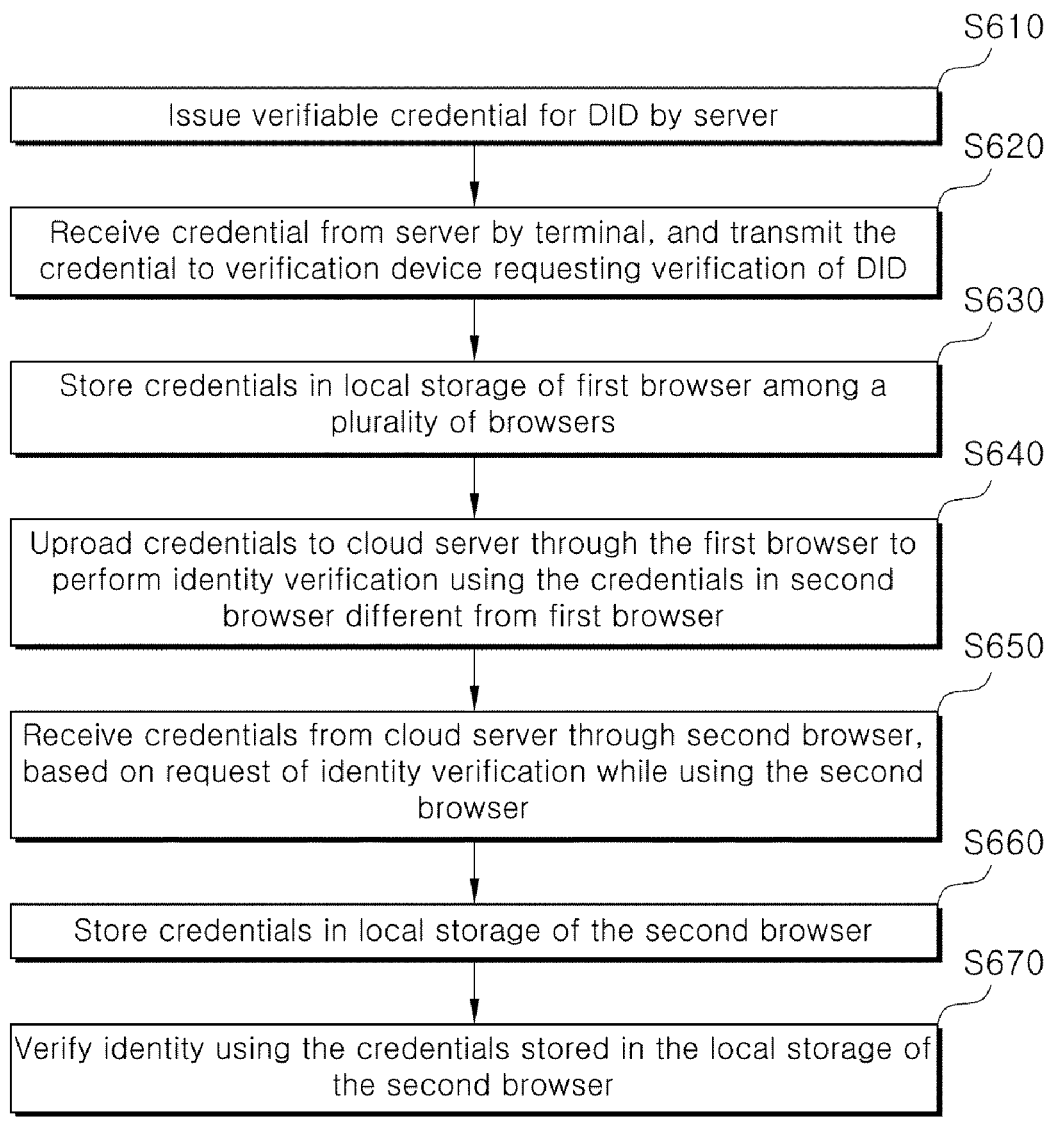
FIG. 6 is a conceptual diagram depicting the control method of the DID system according to another embodiment of the present disclosure.

FIG. 6 is a conceptual diagram depicting the control method of the DID system according to another embodiment of the present disclosure.

First, as illustrated in FIG. 2, an operation (S610) of the server 100 issuing verifiable credentials for the decentralized identifier (DID), and an operation (S620) of the terminal 200 receiving the credentials from the server and transmitting the credentials to the verification device 300, which requests verification of the decentralized identifier will be carried out.

In this instance, the terminal 200 may include a plurality of browsers.

In the present disclosure, an operation (S630) of the terminal 200 storing the credentials in the local storage of a first browser, among the plurality of browsers, will be carried out.

Thereafter, an operation (S640) of uploading the credentials to the cloud server 500 through the first browser such that the terminal 200 performs identity verification using the credentials in a second browser, which is different from the first browser will be carried out.

In a state in which the plurality of browsers are provided (installed), the terminal 200 may store the verifiable credentials in the local storage of the first browser among the plurality of browsers when receiving the verifiable credentials of the decentralized identifier from the server 100.

The first browser may be at least one among the plurality of browsers, namely, any one of the default browser, or a browser that requested the credentials to the server.

Based on the request for identity verification during the use of the second browser, an operation (S650) of receiving the credentials from the cloud server 500 through the second browser will be carried out.

While using a service, the terminal 200 may receive a request for identity verification from the verification device 300, which provides the service, not through the first browser in which the credentials are stored but through the second browser.

In this case, the terminal 200 may transmit (register) the credentials stored in the local storage of the first browser to the cloud server 500 so as to perform identity verification through the second browser.

Subsequently, the terminal 200 may download (receive) the credentials from the cloud server 500, and store the same in the local storage of the second browser (S660).

Thereafter, the terminal 200 may perform the requested identity verification using the credentials stored in the local storage of the second browser (S670). That is, the terminal 200 may perform PIN authentication on the second browser and transmit the credentials stored in the local storage of the second browser to the verification device 300 that requested the identity verification in order to access the credentials stored in the local storage of the second browser.

The terminal 200 may encrypt the credentials in the process of transmitting the credentials to the cloud server 500, registering (storing) the credentials in the local storage of the first browser, and registering (storing) the credentials in the local storage of the second browser.

That is, the terminal 200 may encrypt the credentials stored in the local storage of the first browser, and transmit the credentials to the cloud server 500.

Additionally, the terminal 200 may register the PIN number after passing through self-verification in order to perform PIN authentication of the first browser and the second browser, and the relevant contents may be inferred and applied in the same or similar manner.

The terminal 200 may decrypt the encrypted credentials stored in the storage in order to perform identity verification.

In other words, the terminal 200 may decrypt the encrypted credentials received from the cloud server 500 through the second browser to perform identity verification (that is, transmit the decrypted credentials to the verification device 300 which requested identity verification). After completion of identity verification, the terminal 200 may encrypt the credentials and store the encrypted credentials in the local storage of the second browser.

Meanwhile, the credentials received from the server 100 may be stored only in the local storage of the first browser among the plurality of browsers. In this case, if identity verification is requested while using the second browser different from the first browser, the terminal 200 may execute the first browser to perform identity verification using the credentials stored in the local storage of the first browser.

Thereafter, the terminal 200 may perform identity verification using the credentials stored in the local storage of the first browser. In other words, the terminal 200 executes the first browser, performs security PIN authentication for the first browser, accesses the credentials stored in the local storage of the first browser, and transmits the credentials stored in the local storage of the first browser to the verification device to perform identity verification.

After identity verification is completed, the terminal 200 terminates the first browser and may return to the second browser.

That is, during identity verification through the first browser, the second browser can be running in the background state of the terminal 200. Afterwards, when identity verification through the first browser is completed, the terminal 200 may terminate the execution of the first browser and execute the second browser, which is running in the background state, in the foreground state.

Meanwhile, the DID system of the present disclosure may also copy (or move) the credentials stored in the local storage of the first browser directly to the local storage of the second browser without passing through the cloud server 500.

In this case, the terminal 200 copies the credentials stored in the local storage of the first browser without running the first browser and stores them in the local storage of the second browser. Through security PIN authentication of the second browser, it can access the credentials stored in the local storage of the second browser and perform identity verification.

Meanwhile, in the present disclosure, there may be cases in which the user loses the terminal 200 or has multiple terminals, and in such cases, the DID system of the present disclosure may include a new terminal different from the terminal 200.

The new terminal may include at least one of the first browser and the second browser.

The new terminal may download the credentials uploaded to the cloud server 500 to perform identity verification through at least one of the first browser and the second browser.

Subsequently, the new terminal may decrypt the encrypted credentials received from the cloud server 500, and transmit the credentials to the verification device 300 that requested identity verification.

Figure 7:
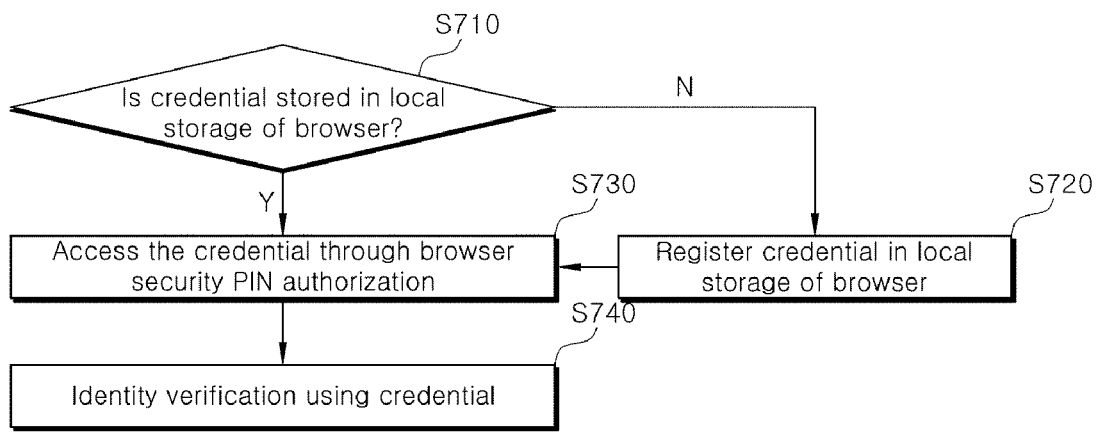
FIGS. 7, 8, and 9 are flow charts depicting various embodiments according to whether or not credentials are stored in a local storage of a browser.
Figure 8:
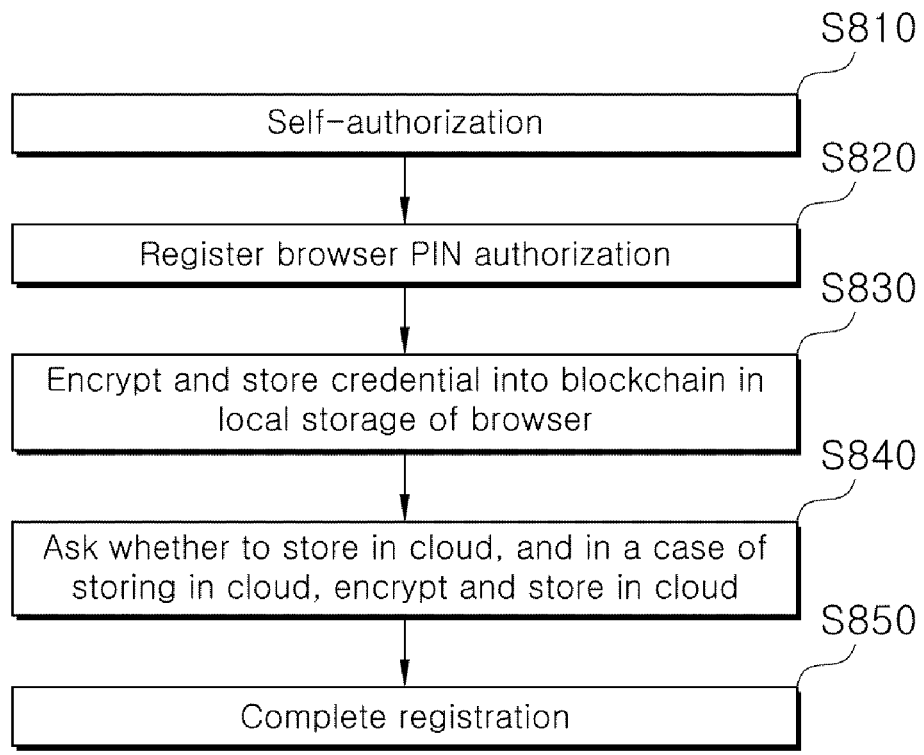
Figure 9:
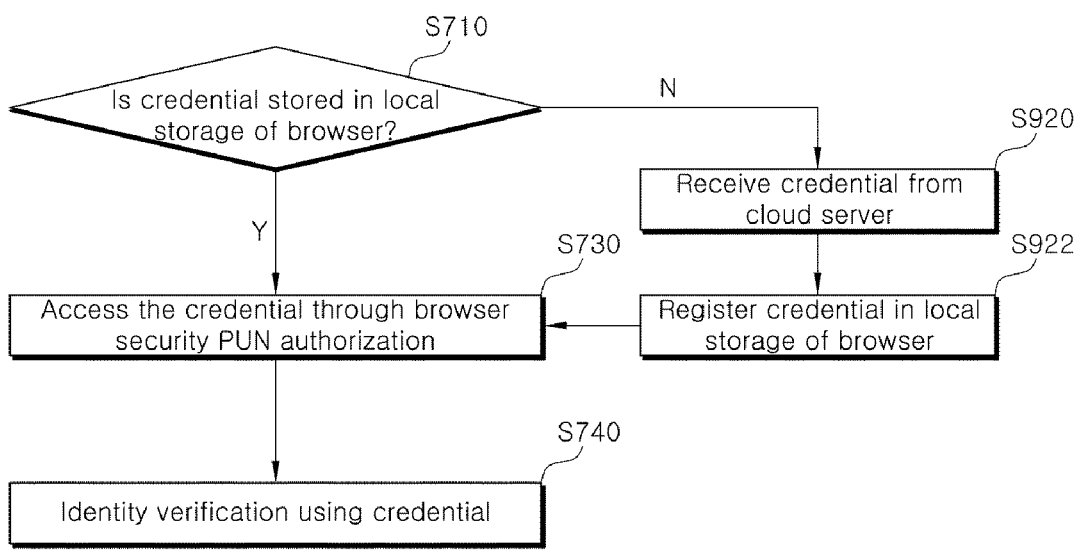

FIGS. 7, 8, and 9 are flow charts depicting various embodiments according to whether or not credentials are stored in a local storage of a browser.

Referring to FIG. 7, in the present disclosure, the terminal 200 may determine whether the credentials are stored in the local storage of the browser (S710). Here, the browser may be the browser in use at the time of receiving the request for the identity verification.

Thereafter, in a case in which the credentials do not exist in the local storage of the browser, the terminal 200 may register the credentials in the local storage of the browser (S720). The process of registering the credentials may be inferred and applied similarly to the description of FIG. 3.

On the other hand, in a case in which the credentials already exist in the local storage of the browser, the terminal 200 may access the credentials through browser security PIN authentication (S730), and perform identity verification using the credentials (S740).

Referring to FIG. 8, in order to register the credentials in the cloud server 500, the terminal 200 may perform self-authentication (S810), register the browser PIN authentication (PIN number) (S820), and encrypt and store the credentials in the local storage of the browser (S830).

Thereafter, the terminal 200 may inquire about whether to store the credentials in the cloud server 500 and encrypt and store the credentials in the selected cloud (S840), and complete the registration of the credentials in the cloud server 500 (S850).

Referring to FIG. 9, the terminal 200 may determine whether the credentials are stored in the local storage of the browser (S710), and if not, may receive the credentials from the cloud server 500 (S920).

Thereafter, the terminal 200 may register (store) the credentials received from the cloud server 500 in the local storage of the browser (S922).

Thereafter, in order to perform identity verification, the terminal 200 may access the credentials through browser security PIN authentication (S730), and perform identity verification using the credentials (S740).

Figure 10:
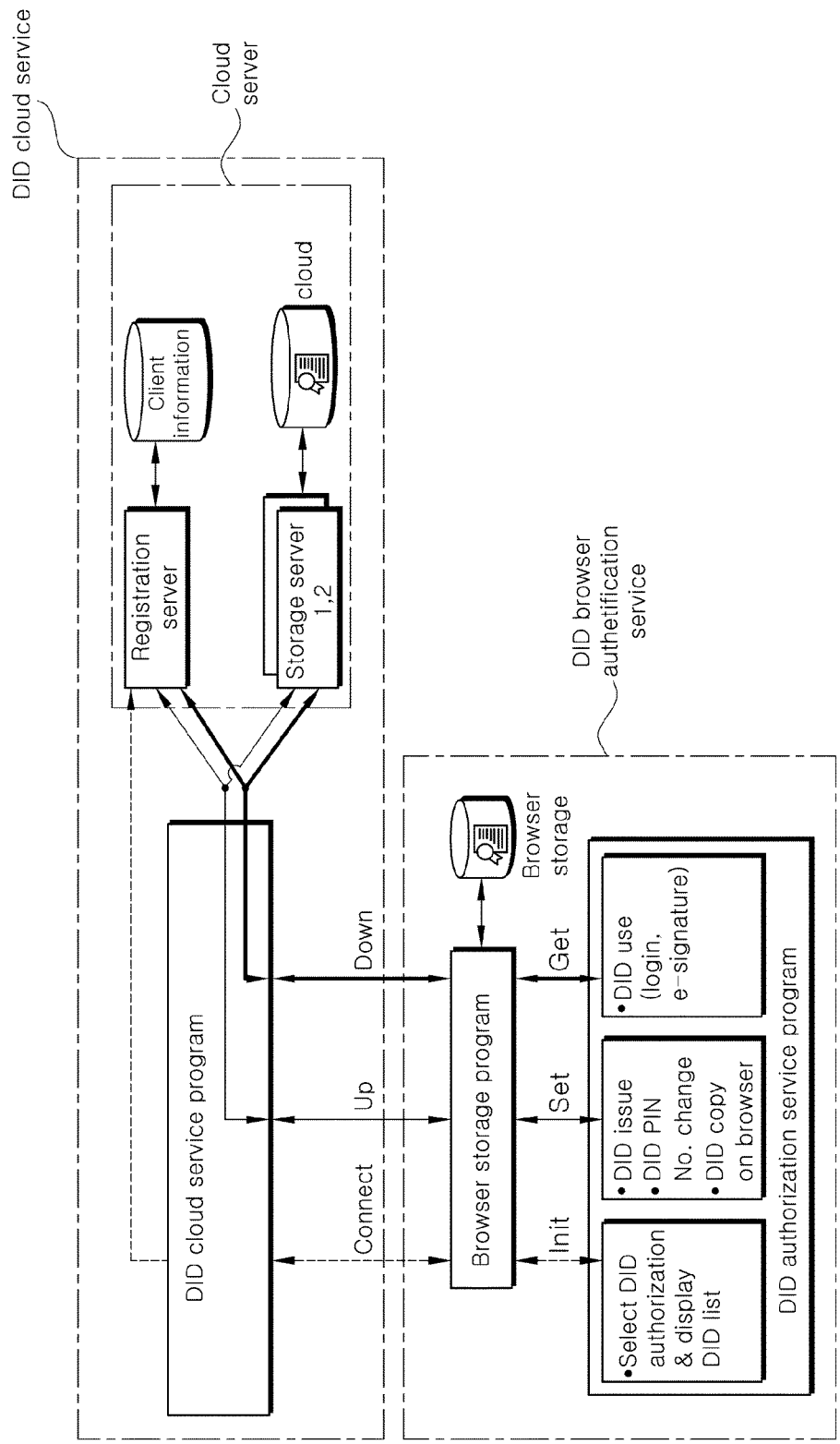
FIG. 10 is a conceptual diagram depicting an operation of the DID system according to an embodiment of the present disclosure.

FIG. 10 is a conceptual diagram illustrating the operation of the DID system according to an embodiment of the present disclosure.

Referring to FIG. 10, the terminal 200 included in the DID system of the present disclosure may have a browser authentication service program and a browser storage program installed to provide the DID browser authentication service.

The browser authentication service program is a program that provides and controls the overall process of identity verification on the browser, and may perform tasks such as displaying a list of DID authentication certificates (credentials) and managing PIN numbers to access the local storage of the browser.

In addition, the browser storage program may perform functions to control credentials stored in the local storage of the browser.

Furthermore, the DID system of the present disclosure may have a DID cloud service program installed to provide a DID cloud service, and the DID cloud service program may be installed in a cloud server or a terminal.

The DID cloud service program may perform the role of an administrator transmitting and receiving data (such as credentials) between the terminal 200 and the cloud server 500.

The cloud server 500 may store credentials and decentralized identifiers (or DID documents).

Figure 11:
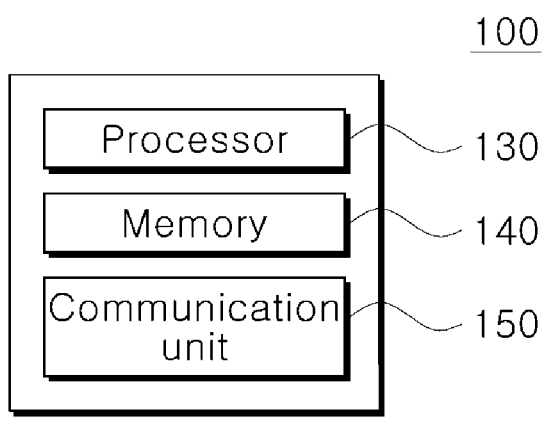
FIGS. 11 and 12 are conceptual diagrams depicting a server and a terminal included in the DID system of the present disclosure.
Figure 12:
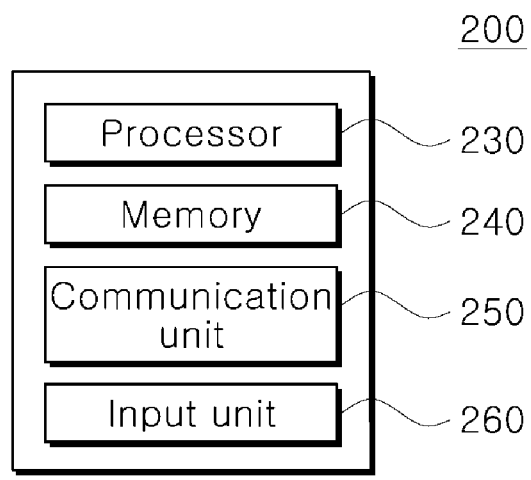

FIGS. 11 and 12 are conceptual diagrams depicting a server and a terminal included in the DID system of the present disclosure.

FIG. 11 is a block diagram illustrating an internal configuration of the server 100, and FIG. 12 is a block diagram schematically illustrating an internal configuration of the terminal 200.

FIGS. 11 and 12 illustrate essential components necessary to describe an embodiment of the present disclosure, but various other configurations such as display devices may be included. Additionally, it will be apparent to those skilled in the art that other configurations necessary to perform the method described in FIGS. 1 to 10 may be included, even if not explicitly described in FIGS. 11 and 12.

Referring to FIG. 11, the server 100 according to an embodiment may include a processor 130, memory 140, and a communication unit 150. The operation of the server 100 performing simple authentication can be executed by running a program stored in the memory 140 through the processor 130.

The communication unit 150 may perform wireless or wired communication between the terminal 200 and/or other servers, or other external devices. For example, the communication unit 150 may perform encrypted communication with the terminal 200 using SSL and may transmit public keys and encrypted data.

Referring to FIG. 12, according to an embodiment, the terminal 200 may include a processor 230, a memory 240, a communication unit 250, and an input unit 260. The operation of the simple authentication terminal 200 may be performed by executing a program stored in the memory 240 through the processor 230.

Meanwhile, the server 100 and the terminal 200 may include one or more processors 130 and 230 and/or one or more memories 140 and 240. Additionally, the memories 140 and 240 may be volatile and/or non-volatile memories. One or more memories 140 and 240 may store commands that allow one or more processors 130 and 230 to perform operations when executed by one or more processors 130 and 230. In the present disclosure, programs or commands may include operation systems for controlling resources of the server 100, applications, and/or middleware for providing various functions to the applications such that the applications can utilize the resources of the device, and the like, as software stored in the memories 140 and 240.

The one or more processors 130 and 230 may control at least one component of the server 100 and the terminal 200 connected to the processor 130 and 230 by running software, e.g., programs, commands. Additionally, the processors 130 and 230 may perform various operations, processing, data generation, and processing related to the present disclosure. The processor 130 and 230 may also load data from the memories 140 and 240, or store data in the memories 140 and 240.

In an embodiment, at least one among the components of the server 100 and the terminal 200 may be omitted or another component may be added. Additionally, or alternatively, some components may be integrated or may be realized s a single entity or plural entities.

The communication unit 150 and 250 may perform wireless communication using any one among enhanced mobile broadband (eMBB), ultra reliable low-latency communications (URLLC), massive machine type communications (MMTC), long-term evolution (LTE), LTE Advance (LTE-A), universal mobile telecommunications system (UMTS), Global system for mobile communications (GSM), code division multiple access (CDMA), wideband CDMA (WCDMA), wireless broadband (WiBro), wireless fidelity (WiFi), Bluetooth, near field communication (NFC), global positioning system (GPS), or global navigation satellite system (GNSS).

The input unit 260 may include means for inputting a user's simple authentication information (PIN number) into the terminal 200, such as a keyboard, a mouse, a touchpad, a camera module, or the like.

The present disclosure can perform DID identity verification on a browser even though a program or an application for the user's identity verification is not installed or is not used, thereby solving the problem of compatibility between programs or applications.

In addition, the present disclosure can easily obtain credentials through the cloud server even in using a browser in which the credentials are not stored, thereby simplifying the identity verification procedure.

Furthermore, in a case in which there is a request for identity verification while using the browser in which the credentials are not stored, the present invention can provide a new control method capable of performing identity verification even if there is no cloud server since performing identity verification by utilizing the browser in which the credentials are stored or by loading the credentials from the browser in which the credentials are stored.

The method according to an embodiment of the present disclosure may be realized as a program (or application) and stored in a medium to be executed in conjunction with a server which is hardware.

The method or algorithm described in relation to the embodiments of the present disclosure can be directly embodied in hardware, can be embodied in a software module executed by hardware, or can be embodied by combination thereof. The software module can reside in a random access memory (RAM), a read-only memory (ROM), an erasable programmable read-only memory (EPROM), an electrically erasable programmable read-only memory (EEPROM), a flash memory, a hard disk, a detachable disk, a CD-ROM, or a medium readable by a computer, well-known in the technical field to which the present disclosure belongs.

The above description is only exemplary, and it will be understood by those skilled in the art that the disclosure may be embodied in other concrete forms without changing the technological scope and essential features. Therefore, the above-described embodiments should be considered only as examples in all aspects and not for purposes of limitation.

The present disclosure can perform DID identity verification on a browser even though a program or an application for the user's identity verification is not installed or is not used, thereby solving the problem of compatibility between programs or applications.

In addition, the present disclosure can easily obtain credentials through the cloud server even in using a browser in which the credentials are not stored, thereby simplifying the identity verification procedure.

Furthermore, in a case in which there is a request for identity verification while using the browser in which the credentials are not stored, the present invention can provide a new control method capable of performing identity verification even if there is no cloud server since performing identity verification by utilizing the browser in which the credentials are stored or by loading the credentials from the browser in which the credentials are stored.

The advantages of the present disclosure are not limited to the above-mentioned advantages, and other advantages, which are not specifically mentioned herein, will be clearly understood by those skilled in the art from the following description.

The invention claimed is:

1. A decentralized identifier (DID) system using browser-based security PIN authentication, comprising:
   a server configured to issue verifiable credentials for a decentralized identifier (DID); and
   a terminal configured to receive the verifiable credentials from the server, and transmit the verifiable credentials to a verification device that requests verification for the decentralized identifier,
   wherein the terminal is further configured to
      store the verifiable credentials issued by the server in a local storage of a browser installed in the terminal,
      execute the browser in a case in which identity verification is requested by the verification device during a provision of a specific service,
      perform browser PIN authentication to access the verifiable credentials stored in the local storage of the executed browser,
      transmit the verifiable credentials to the verification device in a case in which the browser PIN authentication is successful,
      receive purpose information requested by the verification device,
      request issuance of a credential corresponding to the purpose information to the server,
      receive the credential corresponding to the purpose information from the server to include the decentralized identifier of the terminal,
      transmit the credential corresponding to the verification device to the verification device to perform verification of the identity and the purpose information of the terminal,
      register the decentralized identifier in a blockchain-based storage established in advance, and
      delete the verifiable credentials stored in the local storage of the browser in response to a request for deletion of the verifiable credentials, and
   wherein the server is further configured to extract the decentralized identifier registered in the blockchain-based storage in response to the request for identity verification from the verification device.

2. The DID system according to claim 1, wherein the executed browser is a browser storing the verifiable credentials in the local storage or a browser storing the credential corresponding to the purpose information requested by the verification device.

3. The DID system according to claim 1, wherein the server is further configured to generate the verifiable credentials including a decentralized identifier in a case in which the verifiable credentials for the decentralized identifier registered in the blockchain-based storage are requested by the terminal, and
wherein the verifiable credentials including the decentralized identifier are transmitted to the terminal.

4. The DID system according to claim 1, wherein the terminal is further configured to encrypt the verifiable credentials received from the server, and store the encrypted verifiable credentials in the local storage of the browser.

5. The DID system according to claim 1, wherein the server is further configured to issue the verifiable credentials to reflect a use purpose of the decentralized identifier, and transmit the issued verifiable credentials to the terminal, and
wherein the verification device is configured to verify whether or not the decentralized identifier matches the use purpose using the verifiable credentials received from the terminal.

6. A control method of a decentralized identifier (DID) system including a server and a terminal, comprising:
issuing, by the server, verifiable credentials for a decentralized identifier (DID); and
receiving, by the terminal, the verifiable credentials from the server, and transmitting, by the terminal, the verifiable credentials to a verification device that requests verification for the decentralized identifier,
wherein the receiving, by the terminal, the verifiable credentials comprises
storing, by the terminal, the verifiable credentials issued by the server in a local storage of a browser installed in the terminal,
executing, by the terminal, the browser in a case in which identity verification is requested by the verification device during a provision of a specific service,
performing, by the terminal, browser PIN authentication to access the verifiable credentials stored in the local storage of the executed browser,
wherein the transmitting, by the terminal, the verifiable credentials comprises
transmitting, by the terminal, the verifiable credentials to the verification device in a case in which the browser PIN authentication is successful,
receiving, by the terminal, purpose information requested by the verification device,
requesting, by the terminal, issuance of a credential corresponding to the purpose information to the server,
receiving, by the terminal, the credential corresponding to the purpose information from the server to include the decentralized identifier of the terminal,
transmitting, by the terminal, the credential corresponding to the verification device to the verification device to perform verification of the identity and the purpose information of the terminal,
registering, by the terminal, the decentralized identifier in a blockchain-based storage established in advance, and
deleting, by the terminal, the verifiable credentials stored in the local storage of the browser in response to a request for deletion of the verifiable credentials, and
wherein the control method further comprises
extracting, by the server, the decentralized identifier registered in the blockchain-based storage in response to the request for identity verification from the verification device.

7. The control method according to claim 6, wherein the executed browser is a browser storing the verifiable credentials in the local storage or a browser storing the credential corresponding to the purpose information requested by the verification device.

8. The control method according to claim 6, wherein the issuing, by the server, the verifiable credentials comprises
generating, by the server, the verifiable credentials including a decentralized identifier in a case in which the verifiable credentials for the decentralized identifier registered in the blockchain-based storage are requested by the terminal, and
wherein the verifiable credentials including the decentralized identifier are transmitted to the terminal.

9. The control method according to claim 6, wherein the receiving, by the terminal, the verifiable credentials further comprises
encrypting, by the terminal, the verifiable credentials received from the server, and storing, by the terminal, the encrypted verifiable credentials in the local storage of the browser.

10. The control method according to claim 6, wherein the issuing, by the server, the verifiable credentials comprises:
issuing, by the server, the verifiable credentials to reflect a use purpose of the decentralized identifier, and transmitting, by the server, the issued verifiable credentials to the terminal, and
wherein the control method further comprises
verifying, by the verification device, whether or not the decentralized identifier matches the use purpose using the verifiable credentials received from the terminal.

* * * * *